(No Model.)
C. D. STUARD.
PLOW.
No. 444,718. Patented Jan. 13, 1891.
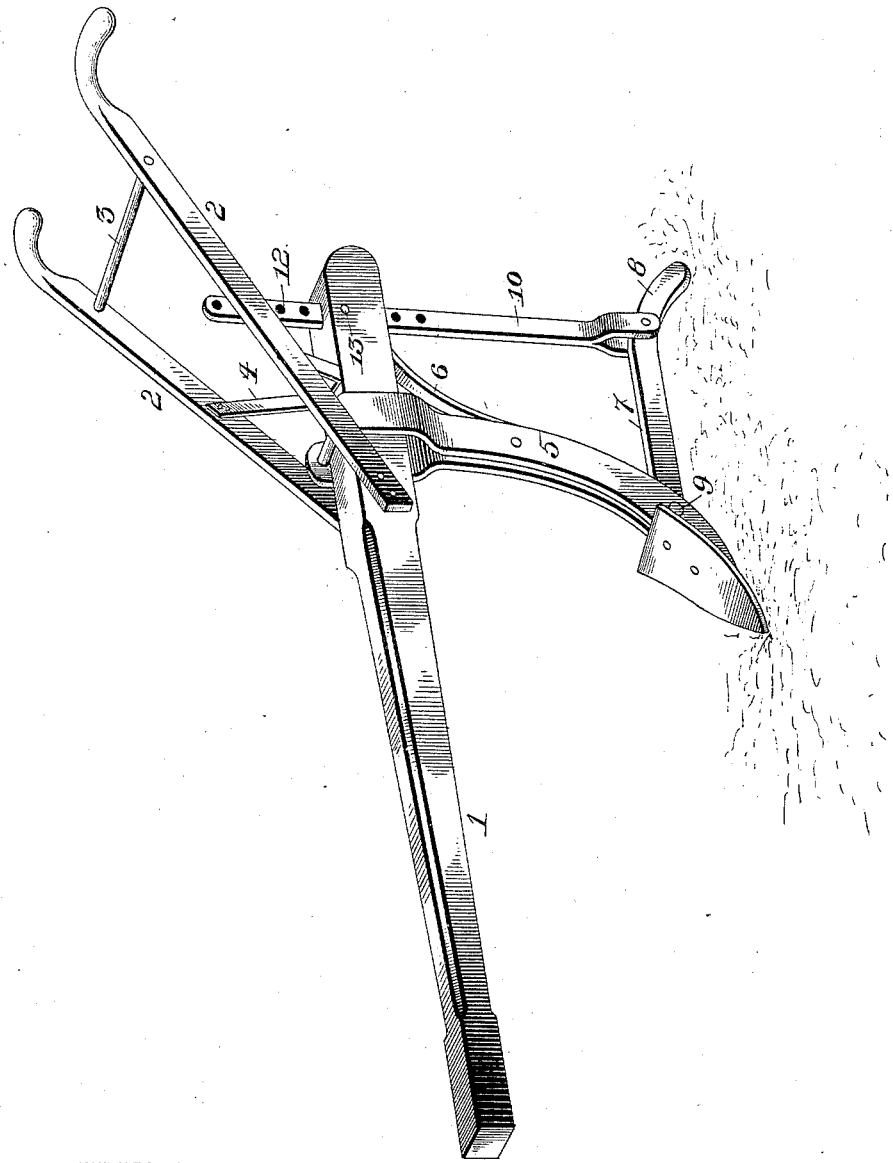
WITNESSES:
F. L. Ourand
W. L. Coombs
INVENTOR:
Charles D. Stuard,
BY
Sauus Bagger & Co,
ATTORNEYS.

UNITED STATES PATENT OFFICE

CHARLES DECATER STUARD, OF McNEIL, TEXAS, ASSIGNOR OF ONE-HALF TO ROBERT McENTYRE, OF SAME PLACE.

PLOW.

SPECIFICATION forming part of Letters Patent No. 444,718, dated January 13, 1891.

Application filed September 6, 1890. Serial No. 364,173. (No model.)

*To all whom it may concern:*

Be it known that I, CHARLES DECATER STUARD, a citizen of the United States, and a resident of McNeil, in the county of Travis and State of Texas, have invented certain new and useful Improvements in Plows; and I do hereby declare that the following is a full, clear, and exact description of the invention, which will enable others skilled in the art to which it appertains to make and use the same, reference being had to the accompanying drawing, which forms a part of this specification.

My invention relates to improvements in attachments for plows, the object being to provide a simple, efficient, and reliable attachment which will serve to cut and pulverize the soil and at the same time will act as a guide to the plow, whereby it may be steadied and caused to run more evenly.

The invention consists in the novel construction and combination of parts hereinafter more fully described, and specifically pointed out in the claim.

In the accompanying drawing the figure represents a perspective view of a plow with my improvement applied thereto.

In the said drawing the reference-numeral 1 designates the plow-beam, and 2 the handles secured thereto, said handles being braced by the cross-bar 3 and brace-rods 4.

The numeral 5 designates the standards, which carry the shovels. These are secured to the plow-beam at their upper ends, and are further secured by means of the brace-rod 6. The shovels, which may be of any ordinary or desired form or construction, are secured to the standards as usual. Secured to the lower ends of the standards is the pivoted backwardly-extending arm 7, provided or formed at its free end with a downwardly-projecting arm 8, which has its forward side formed into a knife-edge. This arm 7 is capable of moving upon its pivot 9, so as to be elevated and depressed by means of the upwardly-extending bar 10, secured thereto and passing through a slot in the beam 1. The upper end of this bar is provided with a series of holes 12, through which passes a pin 13 to hold the bar to any position to which it may be adjusted.

The operation will be readily understood. As the plow passes over the ground, in turning the furrows the arm 7 will follow therein, acting as a guide for the plow and cutting any earth or other obstacles which may be in its way. This arm may be regulated so as to penetrate the earth more or less, as may be found desirable.

The device in practice will be found very useful and efficient, and will materially lessen the difficulty and labor in operating the plow.

Having thus described my invention, what I claim is—

In a plow, the combination, with the beam, the standards 5, provided with shovels, and the brace-rod 6, of the backwardly-extending arm 7, pivoted to standards 5 and having its free end formed into a knife-edge, the vertical bar 10, secured to said arm intermediate of its ends and provided with a series of holes 12, and the pin 13, passing through the beam 1 and through said holes, substantially as described.

In testimony that I claim the foregoing as my own I have hereunto affixed my signature in presence of two witnesses.

CHARLES DECATER STUARD.

Witnesses:
H. R. RUSCH,
W. T. COX.